United States Patent [19]

Shiraishi et al.

[11] Patent Number: 5,187,269

[45] Date of Patent: Feb. 16, 1993

[54] FLUORINE-CONTAINING CELLULOSE DERIVATIVE

[75] Inventors: Nobuo Shiraishi, Kyoto; Motonobu Kubo, Toyonaka, both of Japan

[73] Assignee: Daikin Industries Ltd., Osaka, Japan

[21] Appl. No.: 476,697

[22] Filed: Feb. 8, 1990

[30] Foreign Application Priority Data

Feb. 10, 1989 [JP] Japan .................................. 1-31845
Feb. 28, 1989 [JP] Japan .................................. 1-47098

[51] Int. Cl.$^5$ .......................... C08B 3/08; C08B 3/10; C08B 3/14; C08B 13/00
[52] U.S. Cl. ........................................ 536/56; 536/58; 536/63; 536/66
[58] Field of Search ........................ 536/56, 58, 63, 66

[56] References Cited

U.S. PATENT DOCUMENTS

| | | | |
|---|---|---|---|
| 3,575,960 | 4/1971 | Tesoro | 536/63 |
| 4,487,926 | 12/1984 | Ishikawa et al. | 536/82 |
| 4,582,901 | 4/1986 | Prestwich | 536/83 |
| 4,664,978 | 5/1987 | Wu et al. | 428/409 |
| 4,749,414 | 6/1988 | Wu et al. | 106/183 |

OTHER PUBLICATIONS

Patent Abstracts of Japan, vol. 10, of JP 61-171702, Aug. 1986.
WPI, File Supplier, AN=78-11520A, Derwest Publications Ltd., London, GB; & JP-A-52 156 805, Abstract.
Patent Abstracts of Japan, vol. 8, of JP 59-31725, Feb. 1984.

*Primary Examiner*—Nathan M. Nutter
*Assistant Examiner*—Jeffrey Culpeper Mullis
*Attorney, Agent, or Firm*—Birch, Stewart, Kolasch & Birch

[57] ABSTRACT

A fluorine-containing cellulose derivative of the formula:

$$[C_6H_7O_2(OH)_a(OR)_b(OCOA)_c]_p \quad (I)$$

wherein a is a number of not smaller than 0 (zero), b is a number of not smaller than 0 (zero), c is a number larger than 0 (zero) provided that the sum of a, b and c is 3; p represents a degree of polymerization of the cellulose derivative and is a number of 5 to 3000; R is a hydrogen atom, a substituted or unsubstituted alkyl group having 1 to 8 carbon atoms, a substituted or unsubstituted acyl group having 2 to 8 carbon atoms, a substituted or unsubstituted aryl group having 6 to 20 carbon atoms or a substituted benzoyl group of the formula:

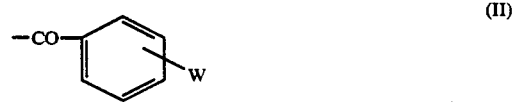

(II)

wherein W is —COOR in which R is a hydrogen atom or a substituted or unsubstituted alkyl group having 1 to 8 carbon atoms; A is a group of the formula:

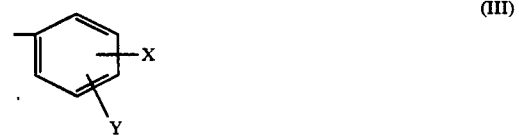

(III)

wherein X is a hydrogen atom, a carboxyl group or an alkyl group having 1 to 5 carbon atoms and Y is a monovalent organic group having 2 to 20 carbon atoms and at least one fluorine atom or A is a group of the formula:

$$-CF_2CZ_2-(OCF_2CF_2CZ_2)_q-F \quad (IV)$$

wherein the Z substituents are the same or different and each a hydrogen atom, a fluorine atom or a chlorine atom and q is a number of 1 to 200, which has better properties than the known fluorine-containing cellulose derivatives.

1 Claim, No Drawings

FLUORINE-CONTAINING CELLULOSE DERIVATIVE

BACKGROUND OF THE INVENTION

1. Field of the Invention

The present invention relates to a fluorine-containing cellulose derivative.

The fluorine-containing cellulose derivative of the present invention has good water and moisture resistance, mold releasability, water and oil repellence and oxygen permeability and is useful as a termiticide, and a material of a molded article, a film or sheet, an ink or paint resin, a coating, an adhesive, a gas or liquid separation membrane, a sealing material for a liquid crystal display cell, an electroluminescence (EL) display cell, a contact lens and the like.

2. Description of the Related Art

A fluorine-containing cellulose derivative can be prepared from a solvent-soluble type cellulose derivative (cf. Japanese Patent Kokai Publication No. 171702/1986). In this process, since a reaction utilizes unsubstituted hydroxyl groups in the cellulose derivative, the prepared derivative has a low degree of substitution and a low fluorine content.

It is known to prepare a fluorine-containing cellulose derivative by directly reacting cellulose with a fluorine-containing compound such as trifluoroacetic acid (cf. Cellulose Chemistry and Technology, 16 (6), 615 (1982)). In this process, the prepared derivative has a low fluorine content and has insufficient functions which are expected from the introduction of fluorine.

SUMMARY OF THE INVENTION

One object of the present invention is to provide a novel fluorine-containing cellulose derivative with a high fluorine content.

Another object of the present invention is to provide a novel fluorine-containing cellulose derivative having good thermal flowability and processability.

These and other objects are accomplished by a fluorine-containing cellulose derivative of the formula:

$$[C_6H_7O_2(OH)_a(OR)_b(OCOA)_c]_p \qquad (I)$$

wherein a is a number of not smaller than 0 (zero), b is a number of not smaller than 0 (zero), c is a number larger than 0 (zero) provided that the sum of a, b and c is 3; p represents a degree of polymerization of the cellulose derivative and is a number of 5 to 3000; R is a hydrogen atom, a substituted or unsubstituted alkyl group having 1 to 8 carbon atoms, a substituted or unsubstituted acyl group having 2 to 8 carbon atoms, a substituted or unsubstituted aryl group having 6 to 20 carbon atoms or a substituted benzoyl group of the formula:

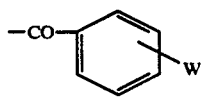

(II)

wherein W is —COOR in which R is a hydrogen atom or a substituted or unsubstituted alkyl group having 1 to 8 carbon atoms; A is a group of the formula:

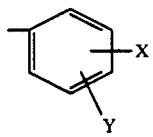

(III)

wherein X is a hydrogen atom, a carboxyl group or an alkyl group having 1 to 5 carbon atoms and Y is a monovalent organic group having 2 to 20 carbon atoms and at least one fluorine atom or A is a group of the formula:

$$-CF_2CZ_2-(OCF_2CF_2CZ_2)_q-F \qquad (IV)$$

wherein the Z substituents are the same or different and each a hydrogen atom, a fluorine atom or a chlorine atom and q is a number of 1 to 200.

Herein, the number of "c" in the formula (I) is referred to as a degree of substitution.

DETAILED DESCRIPTION OF THE INVENTION

In the formula (I), examples of the substituents for the alkyl, acyl or aryl group are a hydroxyl group, a cyano group, a carboxyl group and the like. Preferred examples of the substituted alkyl group are a hydroxyethyl group, a hydroxypropyl group, a cyanoethyl group, a carboxymethyl group, and the like.

Examples of the monovalent organic group Y having the fluorine atom in the formula (III) are a perfluoroalkenyloxy group having 6 to 14 carbon atoms, a fluoroalkyl group having 2 to 20 carbon atoms and the like.

Specific examples of the perfluoroalkenyloxy group are a group of the formula:

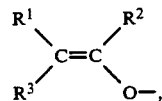

a group of the formula:

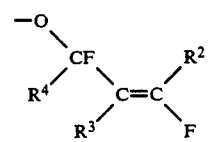

and a group of the formula:

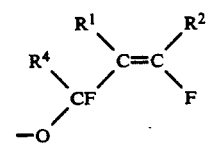

wherein $R^1$, $R^2$ and $R^3$ are the same or different and each a perfluoroalkyl group having 1 to 6 carbon atoms or one of them is a fluorine atom and the rest groups are the same or different and each a perfluoroalkyl group having 1 to 6 carbon atoms, and $R^4$ is a perfluoroalkyl group having 1 to 5 carbon atoms. Preferred perfluoroalkenyloxy groups are those derived from a trimer or tetramer of hexafluoropropylene or a tetramer, pentamer, hexamer or heptamer of tetrafluoroethylene by eliminating one of the fluorine atoms and introducing an oxygen atom to the free bond. Examples of such groups are represented by the following formulas:

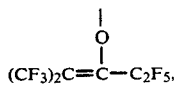

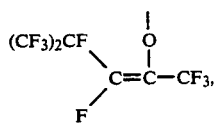

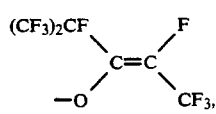

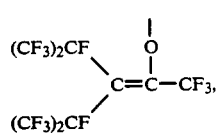

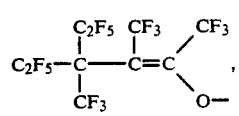

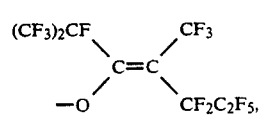

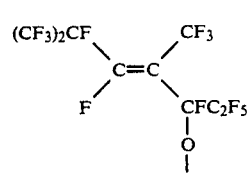

Specific examples of the fluoroalkyl group are $CF_3(CF_2)_n(CH_2)_m-$, $(CF_3)_2CF(CF_2)_k(CH_2)_m-$, $CF_3(CF_2)_kCF(CF_3)(CH_2)_m-$ and $R^5(CF_2)_n(CH_2)_m-$ and wherein $R^5$ is a hydrogen atom, a chlorine atom or a bromine atom, k is a number of 0 to 17, m is a number of 0 to 4 and n is a number of 1 to 19.

As the cellulose raw material, various types of cellulose may be used. The cellulose raw materials include not only cotton linter, dissolved pulp and microcrystalline cellulose but also lignocellulose. Examples of the lignocellulose are ground wood pulp (GP), thermomechanical pulp (TMP), semichemical pulp (SCP), unbleached kraft pulp (UKP), unbleached sulfite pulp (USP), bagasse and wood meal.

In addition, cellulose derivatives having unsubstituted hydroxyl groups can be used. Examples of such cellulose derivatives are cellulose acetate, cellulose butylate, cellulose phthalate, methyl cellulose, ethyl cellulose, hydroxyethyl cellulose, hydroxypropyl cellulose, cellulose nitrate, benzyl cellulose, carboxymethyl cellulose and the like.

The fluorine-containing cellulose derivative (I) of the present invention may be prepared by reacting the cellulose raw material with an acid derivative of the formula:

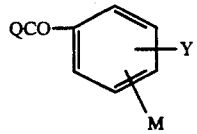  (IIIa)

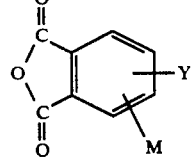  (IIIb)

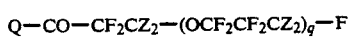  (IVa)

wherein q, Y and Z are the same as defined above, Q is a fluorine atom or a chlorine atom, and M is a hydrogen atom or an alkyl group having 1 to 5 carbon atoms.

The above reaction is preferably carried out in a homogeneous system, although it may be carried out in a heterogeneous system.

When the reaction is carried out in the homogeneous system with the use of cellulose or lignocellulose, an organic solvent is used. A typical organic solvent is dimethylacetoamide (hereinafter referred to as "DMAc") containing lithium chloride, which is disclosed in U.S. Pat. No. 4,302,252.

Preferably, the solvent is dried before the cellulose raw material is dissolved therein. The solvent can be dried by dipping the cellulose raw material in a mixture of DMAc and benzene and distilling off benzene while removing water azeotropically with benzene. The compounds (IIIa), (IIIb) and (IVa) can be dissolved in the above solvent well.

The ratio of each compound (IIIa), (IIIb) or (IVa) to the cellulose raw material is not critical. To effectively introduce the fluorine-containing groups to the cellulose, at least 0.5 equivalent of the compound (IIIa), (IIIb) or (IVa) is preferably used per one glucose residue.

For the purpose of smooth reaction of the cellulose raw material and the compounds (IIIa), (IIIb) and (IVa), an esterification catalyst is preferably used. As the catalyst, a compound which accelerates the reaction but does not react with the reaction solvent such as a base triethylamine and pyridine can be used.

The amount of the catalyst is preferably from 0.1 to 10 equivalents per one glucose residue of the cellulose. A larger amount of the catalyst has no influence on the degree of substitution. When triethylamine is used, the cellulose raw material is first dissolved in the solvent and then the compound (IIIa), (IIIb) or (IVa) is dissolved followed by the dropwise addition of triethylamine at a reaction temperature, or the cellulose raw material is first dissolved and then the compound (IIIa), (IIIb) or (IVa) and triethylamine are simultaneously dropwise added at the reaction temperature, since the presence of triethylamine tends to decrease the solubility of the cellulose raw material in the solvent.

The reaction temperature is not critical. Preferably, it is from about 0° C. to about 100° C.

After the reaction is completed, the desired fluorine-containing cellulose derivative is recovered from the reaction mixture by a per se conventional method. For example, the reaction mixture is poured in a poor solvent to precipitate the cellulose derivative and the precipitated material is collected by filtration. The collected cellulose derivative can be purified by dispersing the cellulose derivative in acetone to extract the residual solvent, or by dissolving the wet cellulose derivative which is just collected from water in ethanol, pouring the ethanol solution in deionized water to precipitate the cellulose derivative.

DMAc and lithium chloride can be recovered from the filtrate by extraction with an organic solvent.

Increase of the weight of the cellulose derivative and the degree of substitution can be determined by drying the purified cellulose derivative under vacuum to bone dry and weighing the weight. Alternatively, the degree of substitution can be calculated from a result of elemental analysis of the product. In general, both results coincide with each other.

When the cellulose derivative having the unsubstituted hydroxyl groups is used as the raw material, a solvent in which such cellulose derivative is dissolved is used. Examples of such solvent are acetone and ethyl acetate.

PREFERRED EMBODIMENTS OF THE INVENTION

The present invention will be illustrated by following Examples.

EXAMPLES 1-6

To a solution of 7.8% lithium chloride in DMAc (50 ml), cellulose (Whatman Cellulose CF-11) (0.5 g) was dissolved. To the resulting solution, triethylamine (2.6 ml, 6 moles per mole of cellulose units) and a solution of 4-perfluorononenyloxyphthalic anhydride (11.0 g, 6 moles per mole of cellulose units) of the formula:

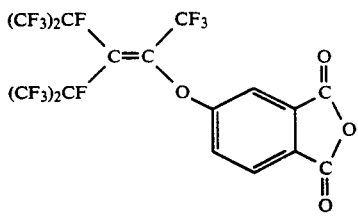

in DMAc (13 ml) were dropwise added simultaneously from a respective dropping funnel equipped with a side tube at 20° C. while stirring. After dropping, the flask was sealed and the mixture was reacted for a predetermined time shown in Table 1 at 20° C.

After reaction, the reaction mixture was poured in a large amount of ethanol and stirred overnight at room temperature. The precipitated material was collected by centrifugation and dispersed in about 500 ml of acetone followed by stirring at room temperature for at least 2 hours. The solid material was collected by centrifugation, again poured in a large amount of ether and stirred for at least 2 hours followed by filtration through a G-4 glass filter. The colleted material was dried at room temperature under reduced pressure and then vacuum dried at room temperature to a constant weight, from which the increase of weight and a degree of substitution were calculated.

The results are shown in Table 1.

TABLE 1

| Example No. | Time for esterification (hrs) | Increase of weight (%) | Degree of substitution | Fluorine content (%) |
| --- | --- | --- | --- | --- |
| 1 | 0.5 | 419 | 1.1 | 43.4 |
| 2 | 1 | 495 | 1.35 | — |
| 3 | 2 | 507 | 1.38 | — |
| 4 | 5 | 651 | 1.8 | — |
| 5 | 10 | 751 | 2.1 | — |
| 6 | 22 | 759 | 2.1 | 47.8 |

The result of $^{19}$F-NMR of the product prepared in Example 6 are as follows:

External standard: trifluoroacetic acid in trichlorotrifluoroethan/methanol ($\frac{1}{4}$v/v) ($\delta$ ppm on the higher magnetic field side is plus)

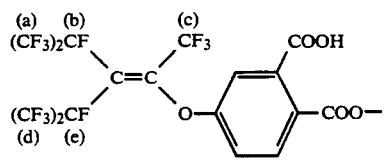

(a) Overlapping with the peak for the solvent (b) +89.4; 1F (c) −21.3; 3F (d) −6.3; 6F (e) +91.4; 1F

Example 7

In the same manner as in Example 1 but using 4-perfluorononenyloxybenzoyl chloride (10.9 g, 6 moles per mole of the cellulose units) of the formula:

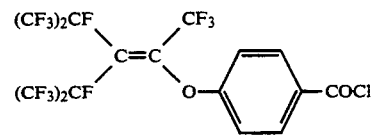

as the esterifying agent in place of 4-perfluorononenyloxyphthalic andhydride and neglecting the step for dispersing the precipitated material in acetone, the reaction was carried out for 22 hours. The increase of weight was 580%, the degree of substitution was 1.7 and the fluorine content was 49.0%.

Example 8

In the same manner as in Example 1 but adding pyridine (1.4 ml, 5.6 moles per mole of cellulose units) in place of triethylamine with a pipette and proceeding the reaction at 50° C., the reaction was carried out for 22 hours. The increase of weight was 721%, the degree of substitution was 2.1 and the fluorine content was 47.1%.

Example 9

In the same manner as in Example 8 but using 4-perfluorononenyloxybenzoyl chloride (10.9 g), the reaction was carried out for 22 hours. The increase of weight was 648%, the degree of substitution was 1.9 and the fluorine content was 49.1%.

Comparative Example 1

In the same manner as in Example 5 but using trifluoroacetic anhydride (6 moles per mole of the cellulose units) in place of 4-perfluorononenyloxyphthalic anhydride, the reaction was carried out to obtain cellulose trifluoroacetate. The increase of weight was 148%, the degree of substitution was 2.5 and the fluorine content was 35.1%.

Experiment 1

Each of the fluorine-containing cellulose derivatives prepared in Example 5 and Comparative Example 1 in the powder form was kept standing in a desiccator containing a saturated aqueous solution of sodium nitrate at 25° C. for 10 days. The water content of the cellulose derivative was 0.6% (Example 5) and 1.6 (Comparative Example 1).

Example 10

(1) Preparation of a solution of cellulose in LiCl/DMAc (according to A. F. Turbak)

To vacuum dried Whatman Cellulose CF-11 (0.3 g) in a 100 ml round bottom flask, DMAc (35 ml) and benzene (20 ml) were added and heated to 80° C. The residual water was removed by azeotripic distillation with benzene. Then, lithium chloride (2.7 g) which had been dried with hot air at 105° C. was added followed by stirring overnight to obtain a colorless transparent solution of cellulose in LiCl/DMAc.

(2) Preparation of fluorine-containing cellulose derivative

To the solution of cellulose prepared in the step (1), a solution of the compound (IVa) wherein Z is a hydrogen atom, Q is a fluorine atom and q is 23 on the average (6 moles per mole of the cellulose units) in DMAc (20 ml) containing pyridine (1.35 ml, 9 moles per mole of the cellulose units) was dropwise added from a dropping funnel equipped with a side tube while stirring at 70° C. After addition, a condenser having a calcium chloride tube was attached to the flask, and the mixture was reacted at 70° C. for 2 hours while stirring.

After the reaction, the reaction mixture was poured in a large amount (about 300 ml) of methanol while stirring to precipitate the reaction product and the unreacted compound (IVa). To remove the unreacted compound (IVa) from the precipitate, the precipitate was dispersed in a large amount of acetone and kept standing for one day to dissolve the compound (IVa) in acetone. Then, the precipitate was collected by filtration through a G-3 glass filter and washed with ether followed by drying with a vacuum desiccator and an aspirator. Further, the product was vacuum dried at room temperature to a constant weight. The increase of weight was 124% and the degree of substitution was 0.065. The fluorine content was 31.9%, which well coincided with 32.2% calculated from the increase of weight.

Example 11

To the cellulose solution prepared in the step (1) of Example 10, pyridine (1.35 ml, (9 moles per mole of the cellulose units) was added and then the compound (IVa) wherein q is 1, namely 1,1,2,2,3-pentafluoropropyloxy-2,2-difluoropropionyl fluoride (1.5 g =2 ml, 3 moles per mole of the cellulose units) was dropwise added while stirring at 70° C. After addition, the mixture was reacted at 70° C. for 8 hours in the similar manner to Example 10.

After the reaction, the reaction mixture was carefully added to a large amount of deionized water while stirring followed by stirring at room temperature overnight.

Then, the precipitated material was collected by filtration through a G-4 glass filter. The collected material was dissolved in ethanol without drying and, if desired, concentrated. The solution was poured in a large amount of deionized water to precipitate the material followed by stirring overnight. The precipitate was collected by filtration and dried under decreased pressure with an aspirator followed by vacuum drying at room temperature to a constant weight. The increase of weight was 133%, the degree of substitution was 0.90.

The results of $^{19}F$-NMR of this product were as follows:

External standard: Trifluoroacetic acid

Solvent: DMSO—$d_6$ $$\underset{\text{(b)}\quad\text{(a)}\quad\text{(c)}\quad\text{(d)}}{-OCOCF_2CH_2OCF_2-CF_2CH_2F}$$

(a) +9.5; 2F (b) +34.5 − +35.6; 2F (c) +46.8; 2F (d) +164.8; 1F

Comparative Example 2

In the same manner as in Example 11 but using trifluoroacetic anhydride in place of the compound (IVa), the reaction was carried out to obtain cellulose trifluoroacetate. The increase of weight was 107%, the degree of substitution was 1.8 and the fluorine content was 29.9%.

Experiment 1

Each of the fluorine-containing cellulose derivatives prepared in Example 10 and Comparative Example 2 in the powder form was kept standing in a desiccator containing a saturated aqueous solution of sodium nitrate at 25° C. for 10 days. The water content of the cellulose derivative was 0.5% (Example 10) and 1.8 (Comparative Example 2).

What is claimed is:

1. A fluorine-containing cellulose derivative of the formula:

$$[C_6H_7O_2(OH)_a(OR)_b(OCOA)_c]_p \quad (I)$$

wherein a ≧0, b≧0 and c >0 provided that the sum of a, b and c is 3; p represents a degree of polymerization of the cellulose derivative and is a number of 5 to 3000; R is an alkyl group having 1 to 8 carbon atoms, an acyl group having 2 to 8 carbon atoms, an aryl group having 6 to 20 carbon atoms, a cyanoethyl group, a hydroxyethyl group, a hydroxypropyl group or a carboxymethyl group and A is a group of the formula:

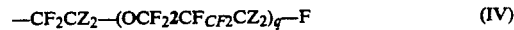

$$-CF_2CZ_2-(OCF_2CFCF_2CZ_2)_q-F \quad (IV)$$

wherein the Z substituents are each a hydrogen, a fluorine or a chlorine and q is a number of 1 to 200.

* * * * *